(12) United States Patent
Deng et al.

(10) Patent No.: US 12,512,740 B2
(45) Date of Patent: Dec. 30, 2025

(54) BIDIRECTIONAL MAGNETIC LEVITATION ACOUSTIC MOTOR DEVICE

(71) Applicant: CREATIVE MOTOR TECHNOLOGY (DONGGUAN) CO., LTD., Dongguan (CN)

(72) Inventors: Min Deng, Yongzhou (CN); Mu Yan, Xiaogan (CN)

(73) Assignee: CREATIVE MOTOR TECHNOLOGY (DONGGUAN) CO., LTD., Dongguan (CN)

(*) Notice: Subject to any disclaimer, the term of this patent is extended or adjusted under 35 U.S.C. 154(b) by 249 days.

(21) Appl. No.: 18/352,205

(22) Filed: Jul. 13, 2023

(65) Prior Publication Data
US 2025/0023436 A1    Jan. 16, 2025

(51) Int. Cl.
| | | |
|---|---|---|
| H02K 33/12 | (2006.01) |
| A61C 17/34 | (2006.01) |
| H02K 1/14 | (2006.01) |
| H02K 1/27 | (2022.01) |
| H02K 1/2706 | (2022.01) |
| H02K 1/34 | (2006.01) |
| H02K 16/00 | (2006.01) |
| H02K 33/14 | (2006.01) |

(52) U.S. Cl.
CPC .............. H02K 33/14 (2013.01); *A61C 17/34* (2013.01)

(58) Field of Classification Search
CPC ........ H02K 33/14; H02K 33/12; H02K 33/00; H02K 33/16; H02K 33/18; H02K 1/12; H02K 1/14; H02K 1/146; H02K 1/27; H02K 1/2706; H02K 1/34; H02K 16/00; H02K 2201/18; A61C 17/32; A61C 17/34; A61C 17/3409; A61C 17/3418; A61C 17/3445; A61C 17/3472; H02N 15/00; H02P 6/00; H02P 6/08; H02P 6/30
See application file for complete search history.

(56) References Cited

U.S. PATENT DOCUMENTS

| | | | | |
|---|---|---|---|---|
| 7,116,018 | B2 * | 10/2006 | Strobl | H02K 33/00 310/36 |
| 8,994,235 | B2 * | 3/2015 | Doll | H02K 16/02 310/38 |
| 2023/0253866 | A1 * | 8/2023 | Huang | H02K 33/16 310/31 |

FOREIGN PATENT DOCUMENTS

| | | | | |
|---|---|---|---|---|
| CN | 207442548 U | * | 6/2018 | |
| CN | 108306552 A | * | 7/2018 | H02N 15/00 |
| CN | 111541312 A | * | 8/2020 | H02K 1/14 |
| CN | 212115113 U | | 12/2020 | |

(Continued)

*Primary Examiner* — Edgardo San Martin
(74) *Attorney, Agent, or Firm* — Nitin Kaushik

(57) ABSTRACT

Provided is a bidirectional magnetic levitation acoustic motor device, including a motor housing and a motor shaft, wherein the motor shaft is arranged at an axis of the motor housing, an end cover is arranged at a bottom end of the motor housing, shaft holes are formed in axes of the motor housing and the end cover, and the motor shaft penetrates through the two shaft holes. With regard to the invention, movement transmission is achieved by means of an electromagnetic effect, and mounting of elastic structures such as a torsion bar and the like is no longer needed, so that on one hand, the situation that the service life of a motor is short due to the fact that the elastic structures are prone to damage during usage is avoided, and on the other hand, the motor in a unit volume can transmit torque in a larger value.

7 Claims, 14 Drawing Sheets

(56) References Cited

FOREIGN PATENT DOCUMENTS

| CN | 212258744 U | * | 12/2020 | |
|----|-------------|---|---------|---|
| CN | 212323821 U | * | 1/2021 | |
| CN | 112332559 A | * | 2/2021 | ............... H02K 1/12 |
| CN | 212588169 U | * | 2/2021 | |
| CN | 213213297 U |   | 5/2021 | |
| CN | 213484594 U | * | 6/2021 | |
| CN | 113162348 A | * | 7/2021 | ............. H02K 1/146 |
| CN | 213906405 U | * | 8/2021 | |
| CN | 214674812 U |   | 11/2021 | |
| CN | 115378218 A | * | 11/2022 | ......... A61C 17/3481 |
| CN | 217824690 U | * | 11/2022 | |
| CN | 116780846 A | * | 9/2023 | ............. H02K 21/14 |
| JP | 2014087238 A | * | 5/2014 | |

* cited by examiner

BIDIRECTIONAL MAGNETIC LEVITATION ACOUSTIC MOTOR DEVICE

TECHNICAL FIELD

The present invention relates to the technical field of motors, in particular to a bidirectional magnetic levitation acoustic motor device.

BACKGROUND

With the continuous improvement of people's living standards, electric toothbrushes begun to appear in the daily life of people to replace traditional toothbrushes to achieve the more ideal and more convenient tooth brushing effects.

The existing electric toothbrushes are usually driven by motors and achieve the tooth cleaning effect through vibration of toothbrush heads. The motors of the existing electric toothbrushes are generally required to be provided with springs or torsion bars like torsional springs, and such structures are prone to damage and are not easy to repair during usage, so that the service lives of the motors often depend on the service time of the above-mentioned structures. In addition, with the adoption of the above-mentioned structural design, the bearing capacity of the motors is low, the torque that can be transmitted by the motors in the unit volume is small, changes of the amplitudes of swing of motor shafts are large when different loads are borne, and the use effect is not stable enough.

Besides, the existing electric toothbrushes generally have the movement loci of radially left and right swinging and do not have the axial telescoping function. However, during tooth brushing in the daily life, people need to clean their teeth by vertical swinging (radial swinging) and also need left and right movements (axial telescoping) to achieve the purpose of all-around cleaning, and how to effectively solve this problem is always a problem to be solved urgently by those skilled in the art.

Therefore, it is necessary to invent a bidirectional magnetic levitation acoustic motor device so as to solve the above-mentioned problem.

SUMMARY

The present invention aims to provide a bidirectional magnetic levitation acoustic motor device, comprising a motor housing and a motor shaft, wherein the motor shaft is arranged at an axis of the motor housing, an end cover is arranged at a bottom end of the motor housing, shaft holes are formed in axes of the motor housing and the end cover, the motor shaft penetrates through the two shaft holes, bearings are arranged at junctions of the motor shaft and the shaft holes, a transmission unit is arranged inside the motor housing, the transmission unit comprises a stator assembly and a rotor assembly, and the rotor assembly is arranged inside the stator assembly:

the stator assembly comprises a stator core and coil windings, insulated coil holders are arranged on two sides of the stator core, stator teeth are arranged at two ends inside the stator core, a pole shoe is fixedly connected to the side of each of the stator teeth that is away from the stator core, the pole shoes match with the rotor assembly, the coil windings are wound around two sides of the stator core, and two ends of each of the coil windings are wound around the insulated coil holders; and the rotor assembly comprises a rotor core and magnetic steel, the rotor core is arranged on an outer side of the motor shaft in an overlying manner, four placing grooves are formed in an outer side surface of the rotor core, the four placing grooves are symmetrically distributed about a bisector of the rotor core, the spacing angles between each of the placing grooves and the placing grooves on two sides thereof are unequal, the magnetic steel is arranged in the four placing grooves, the four pieces of magnetic steel are distributed in a height staggered manner, self-attraction surfaces and non-self-attraction surfaces are formed by the magnetic steel and the stator core, and areas of the self-attraction surfaces are greater than areas of the non-self-attraction surfaces.

Preferably, one or more transmission units are arranged, a rotor framework is arranged between every two adjacent rotor cores, and every two adjacent rotor cores are connected by means of the rotor framework.

Preferably, clamping grooves are formed in two ends of the rotor framework, the clamping grooves match with the rotor cores in section shape, and the clamping grooves are connected to the rotor cores in a buckled manner.

Preferably, the motor housing has a flat or circular section, both the end cover and the stator core match with an inner contour of the motor housing, and the end cover is connected to the motor housing in a riveted manner.

Preferably, the coil windings match with the stator teeth; and each group of the coil windings is provided with a first coil, a second coil, a third coil and a fourth coil respectively, a head of the first coil is connected to a tail of the second coil, a head of the third coil is connected to a tail of the fourth coil, a head of the second coil and a head of the fourth coil are electrically connected and led out, and a tail of the first coil and a tail of the third coil are connected together and led out.

Preferably, the four coil windings are divided into two groups, the two groups of coil windings are respectively set as upper and lower windings and left and right windings, the upper and lower windings have identical magnetic fields after being electrified, and the left and right windings have opposite magnetic fields after being electrified.

Preferably, the four pieces of magnetic steel are divided into two groups, the two pieces of magnetic steel in each of the two groups have opposite polarities, and the two groups of magnetic steel have correspondingly identical upper and lower polarities.

Preferably, one end of the motor shaft extends out of one side of the motor housing.

In the above-mentioned technical solutions, the present invention has the technical effects and advantages as follows:

movement transmission is achieved by means of an electromagnetic effect, and mounting of elastic structures such as a torsion bar and the like is no longer needed, so that on one hand, the situation that the service life of a motor is short due to the fact that the elastic structures are prone to damage during usage is avoided, and on the other hand, the motor in a unit volume can transmit torque in a larger value: when the device is applied to an electric toothbrush, the weight of the electric toothbrush can be reduced, the electric toothbrush telescopes vertically while swinging left and right, which is closer to the feeling of brushing teeth in daily life, and the cleaning effect is greatly improved: power is transmitted by means of an electromagnetic structure, thus the power transmission process is more stable, the magnitude of swing of the motor shaft will not change greatly in case of different loads, and the usage by a user is facilitated; and compared with the prior art, the electric toothbrush can rotate axially and radially at the same time for tooth brushing, and the gap that electric toothbrushes cannot telescope axially apart from radially swinging left and right in the market is filled.

BRIEF DESCRIPTION OF DRAWINGS

In order to explain the technical solutions in embodiments of the present application or the prior art more clearly, drawings needed by the embodiments will be briefly introduced below. Obviously, the drawings in the following descriptions are only some embodiments recited in the present invention, and for those of ordinary skill in the art, other drawings can be obtained according to these drawings.

Figure 1:
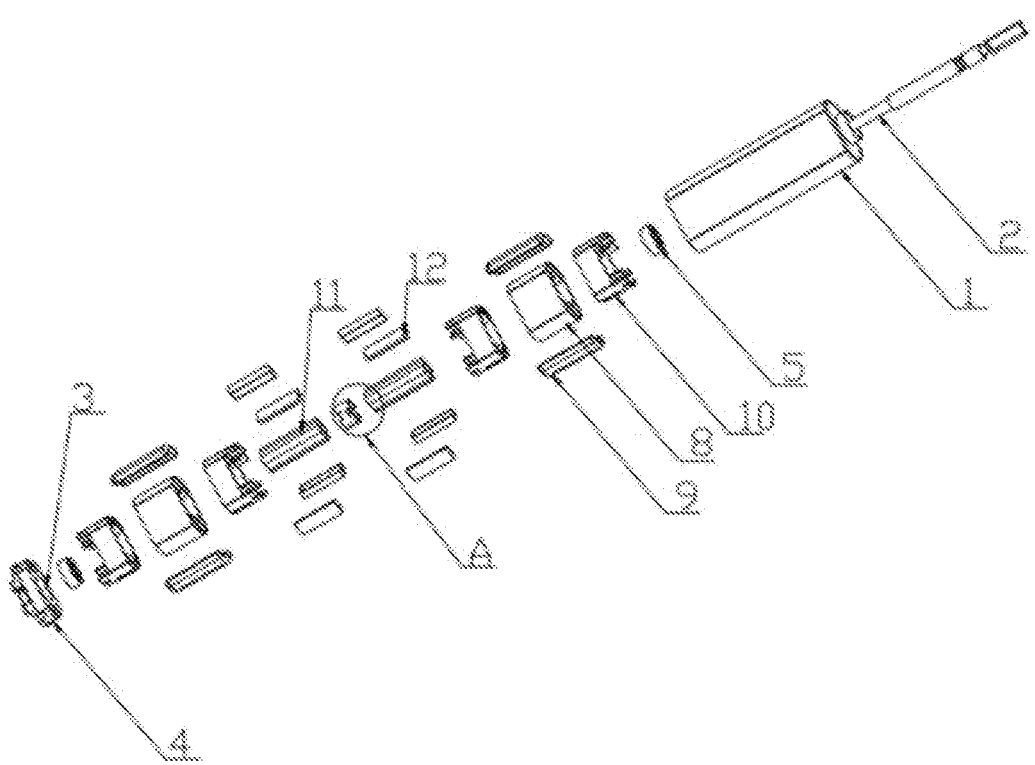
FIG. 1 is an exploded view of an overall structure of the present invention.
Figure 2:
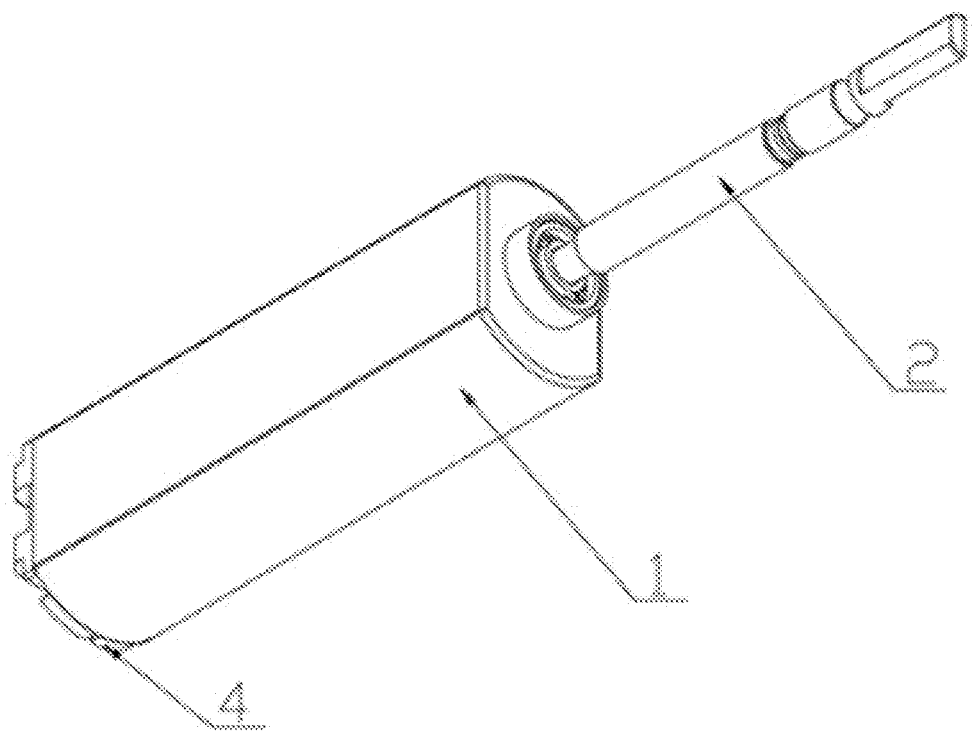
FIG. 2 is a schematic diagram of the overall structure of the present invention.
Figure 3:
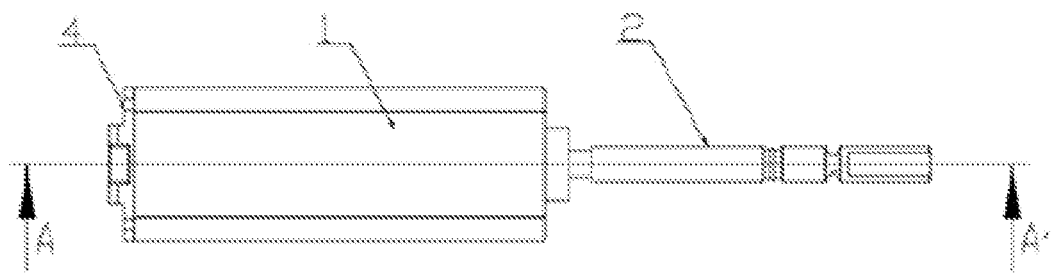
FIG. 3 is a front view of the present invention.
Figure 4:
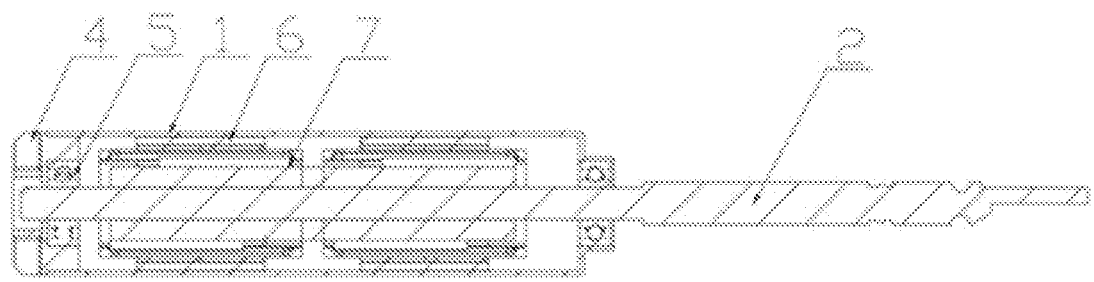
FIG. 4 is a schematic diagram of an A-A' sectional structure in FIG. 3 of the present invention.
Figure 5:
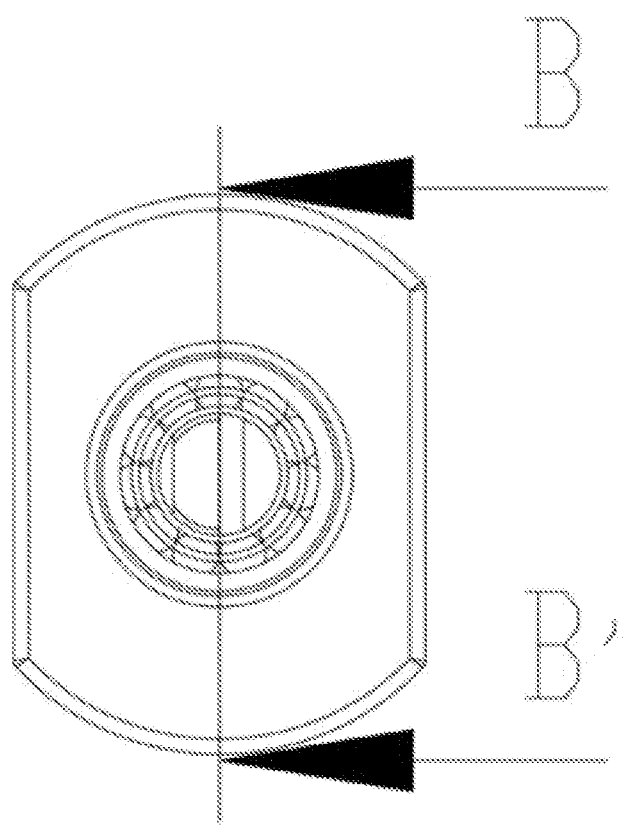
FIG. 5 is a right side view of the present invention.
Figure 6:
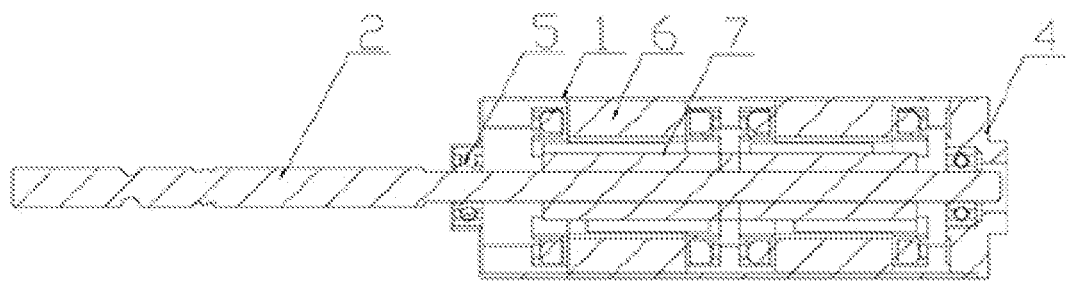
FIG. 6 is a schematic diagram of a B-B' sectional structure in FIG. 5 of the present invention.
Figure 7:
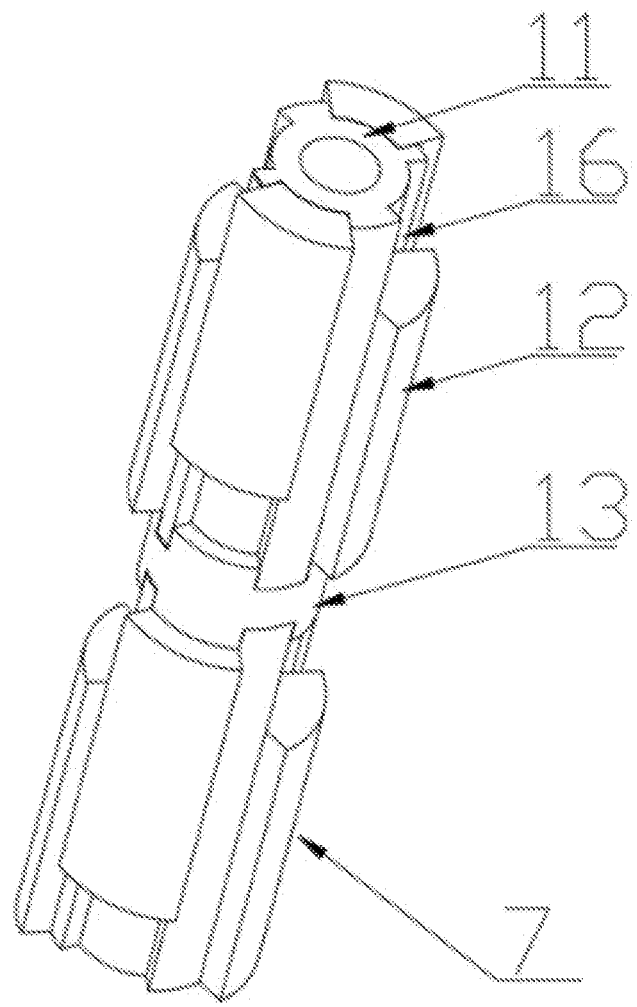
FIG. 7 is a structure schematic diagram of a rotor core of the present invention.

DESCRIPTION OF REFERENCE NUMERALS 1 motor housing, 2 motor shaft, 3 shaft hole, 4 end cover, 5 bearing, 6 stator assembly, 7 rotor assembly, 8 stator core, 9 coil winding, 91, first coil, 92 second coil, 93 third coil, 94 fourth coil, 10 insulated coil holder, 11 rotor core, 12 magnetic steel, 121 self-attraction surface, 122 non-self-attraction surface, 13 rotor framework, 14 stator tooth, 15 pole shoe, 16 placing groove, and 17 clamping groove.

DETAILED DESCRIPTION OF THE EMBODIMENTS

The present invention is further described in detail in conjunction with the accompanying drawings below, so that those skilled in the art can better understand the technical solutions of the present invention.

The present invention provides a bidirectional magnetic levitation acoustic motor device as shown in FIGS. 1-14, comprising a motor housing 1 and a motor shaft 2, wherein the motor shaft 2 is arranged at an axis of the motor housing 1, an end cover 4 is arranged at a bottom end of the motor housing 1, shaft holes 3 are formed in axes of the motor housing 1 and the end cover 4, the motor shaft 2 penetrates through the two shaft holes 3, bearings 5 are arranged at junctions of the motor shaft 2 and the shaft holes 3, a transmission unit is arranged inside the motor housing 1, the transmission unit comprises a stator assembly 6 and a rotor assembly 7, and the rotor assembly 7 is arranged inside the stator assembly 6.

The stator assembly 6 comprises a stator core 8 and coil windings 9, insulated coil holders 10 are arranged on two sides of the stator core 8, stator teeth 14 are arranged at two ends inside the stator core 8, a pole shoe 15 is fixedly connected to the side of each of the stator teeth 14 that is away from the stator core 8, the pole shoes 15 match with the rotor assembly 7, the coil windings 9 are wound around two sides of the stator core 8, two ends of each of the coil windings 9 are wound around the insulated coil holders 10, one, two or more stator teeth 14 may be provided in the same direction, one, two or more corresponding coil windings may also be provided, and one or two pole shoes 15 may be provided according to the distribution of magnetic steel 12 in a space.

The rotor assembly 7 comprises a rotor core 11 and the magnetic steel 12, the rotor core 11 is arranged on an outer side of the motor shaft 2 in an overlying manner, four placing grooves 16 are formed in an outer side surface of the rotor core 11, the four placing grooves 16 are symmetrically distributed about a bisector of the rotor core 11, the spacing angles between each of the placing grooves 16 and the placing grooves 16 on two sides thereof are unequal, the magnetic steel 12 is arranged in the four placing grooves 16, the four pieces of magnetic steel 12 are distributed in a height staggered manner, self-attraction surfaces and non-self-attraction surfaces are formed by the magnetic steel and the stator core, and areas of the self-attraction surfaces 121 are greater than areas of the non-self-attraction surface 122. The self-attraction surface 121 is the region of the magnetic steel 12 where the magnetic attraction force with the stator core 8 is stronger, while the non-self-attraction surface 122 is the region with a comparatively weaker magnetic attraction force. This differential in surface area and magnetic force is fundamental to achieving bidirectional magnetic levitation. In a radial direction, the magnetic steel 12 is attracted by the stator teeth 14, and the areas of the self-attraction surfaces 121 are greater than the areas of the non-self-attraction surface 122, so that levitation in the radial direction can be achieved; in an axial direction, the magnetic steel 12 is attracted by the stator teeth 14, and the areas of the self-attraction surfaces 121 are greater than the areas of the non-self-attraction surface 122, so that levitation in the axial direction can be achieved; in the radial direction, even if the rotor assembly 7 deflects to the maximum position angle, the areas of the self-attraction surfaces 121 are still greater than the areas of the non-self-attraction surface 122; and in the axial direction, even if the rotor assembly 7 axially shifts to the maximum position, the areas of the self-attraction surfaces 121 are still greater than the areas of the non-self-attraction surface 122.

Preferably, one or more transmission units are arranged, a rotor framework 13 is arranged between every two adjacent rotor cores 11, and every two adjacent rotor cores 11 are connected by means of the rotor framework 13.

Preferably, clamping grooves 17 are formed in two ends of the rotor framework 13, the clamping grooves 17 match with the rotor cores 11 in section shape, and the clamping grooves 17 are connected to the rotor cores 11 in a buckled manner.

Preferably, the motor housing 1 has a flat or circular section, both the end cover 4 and the stator core 8 match with an inner contour of the motor housing 1, and the end cover 4 is connected to the motor housing 1 in a riveted manner.

Figure 8:
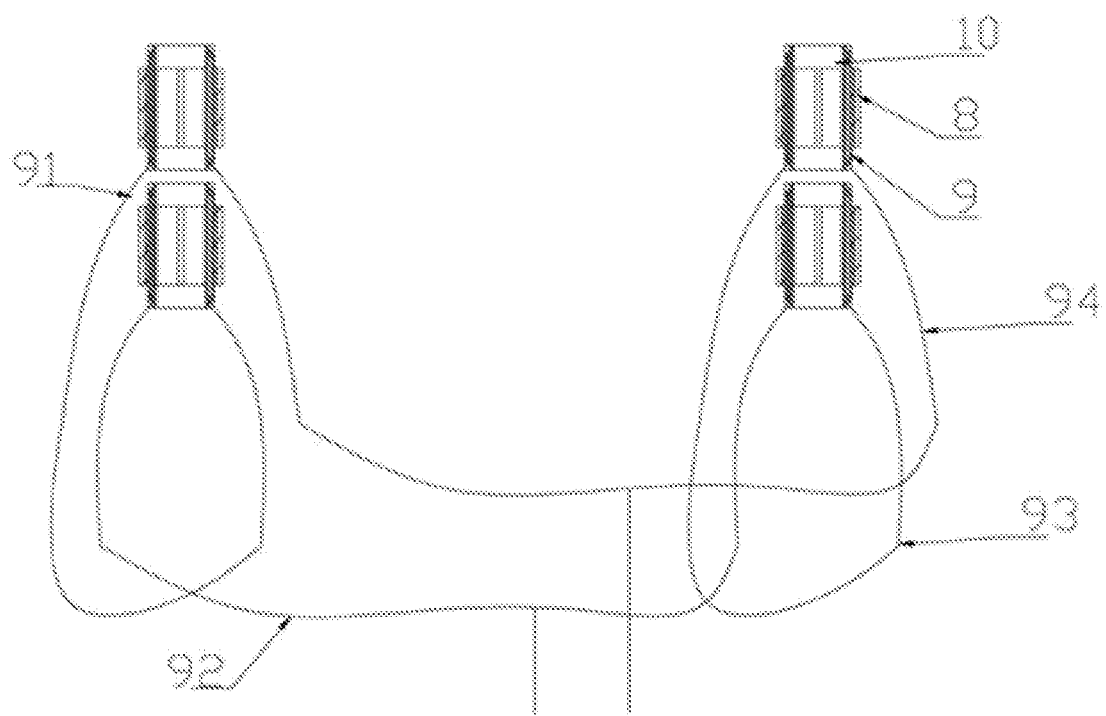
FIG. 8 is a schematic diagram of a connection structure of coil windings of a stator core of the present invention.
Figure 9:
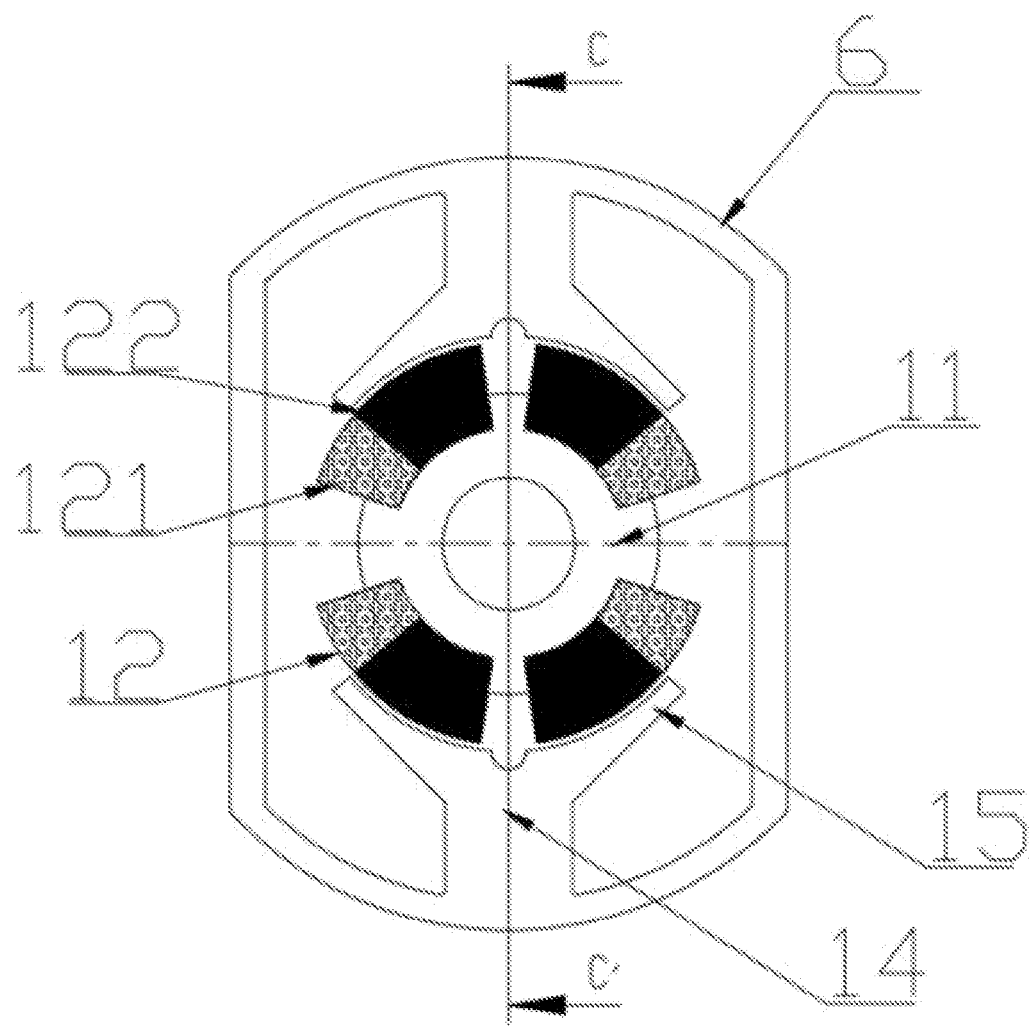
FIG. 9 is a schematic diagram of a distribution structure of self-attraction surfaces and non-self-attraction surfaces of the present invention.
Figure 10:
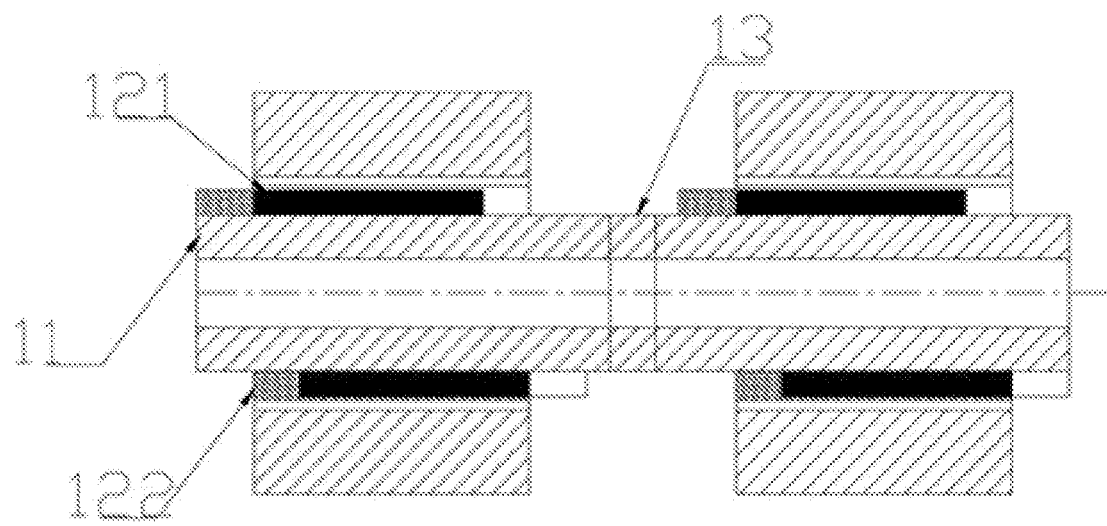
FIG. 10 is a schematic diagram of a C-C' sectional structure in FIG. 9 of the present invention.
Figure 11:
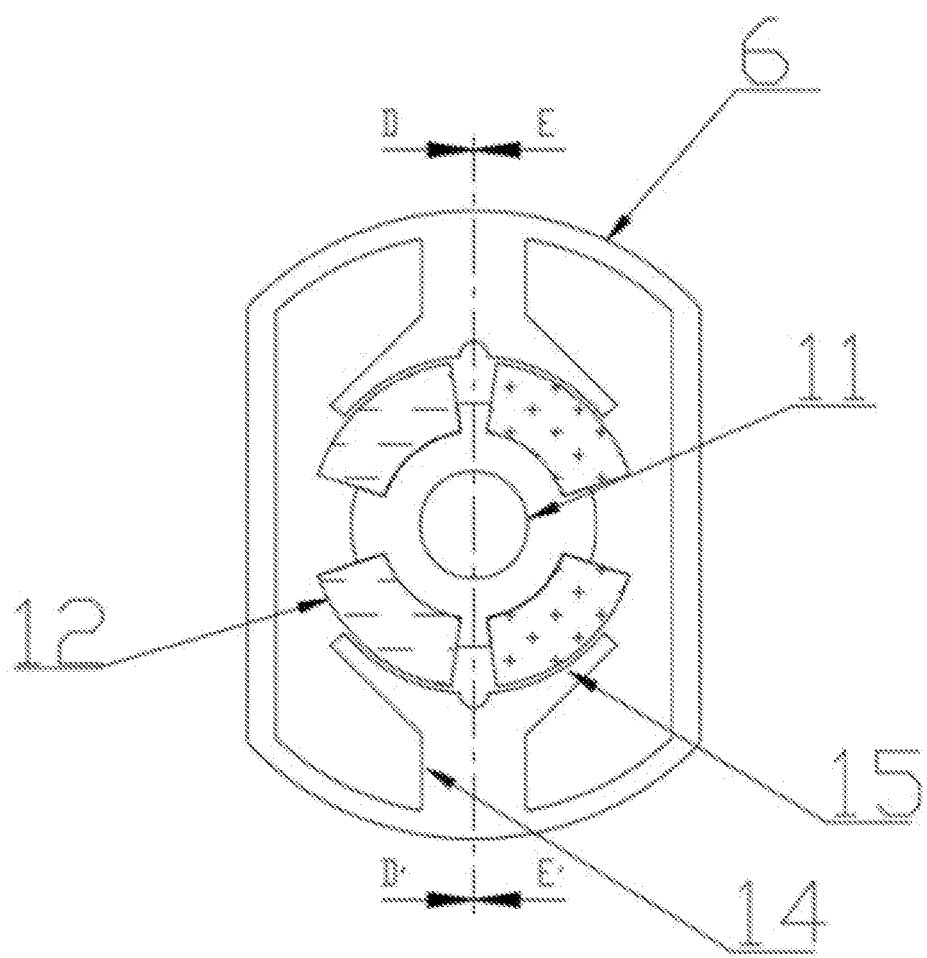
FIG. 11 is a schematic diagram of a polarity distribution structure of magnetic steel of the present invention.
Figure 12:
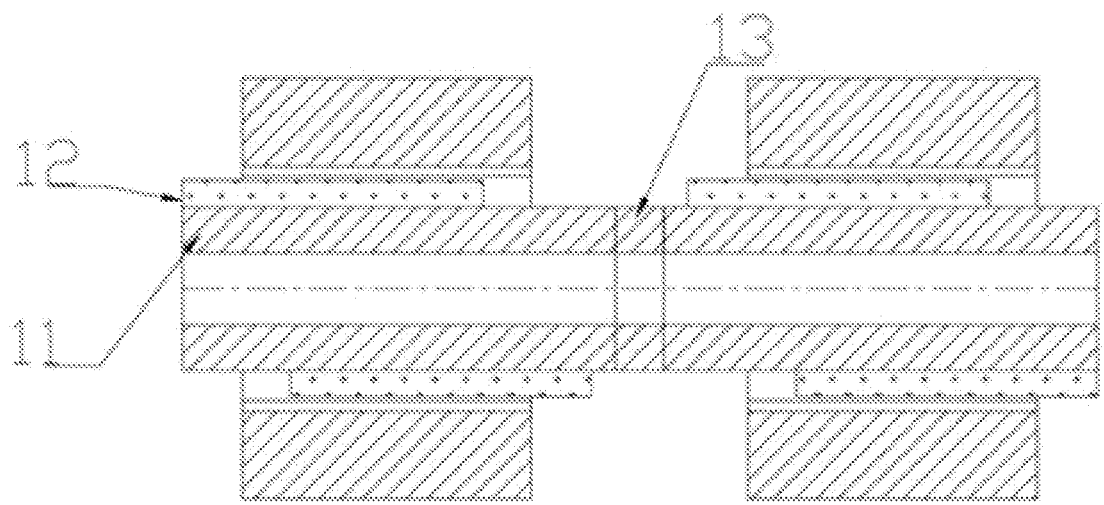
FIG. 12 is a schematic diagram of a D-D' sectional structure in FIG. 11 of the present invention.
Figure 13:
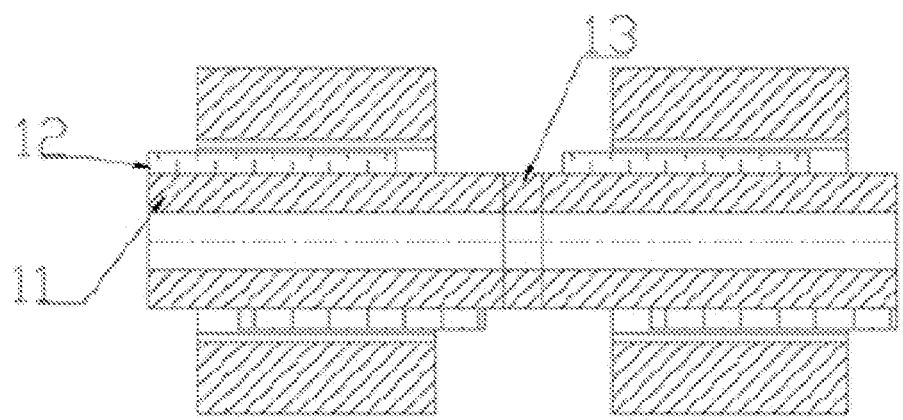
FIG. 13 is a schematic diagram of an E-E' sectional structure in FIG. 11 of the present invention.
Figure 14:
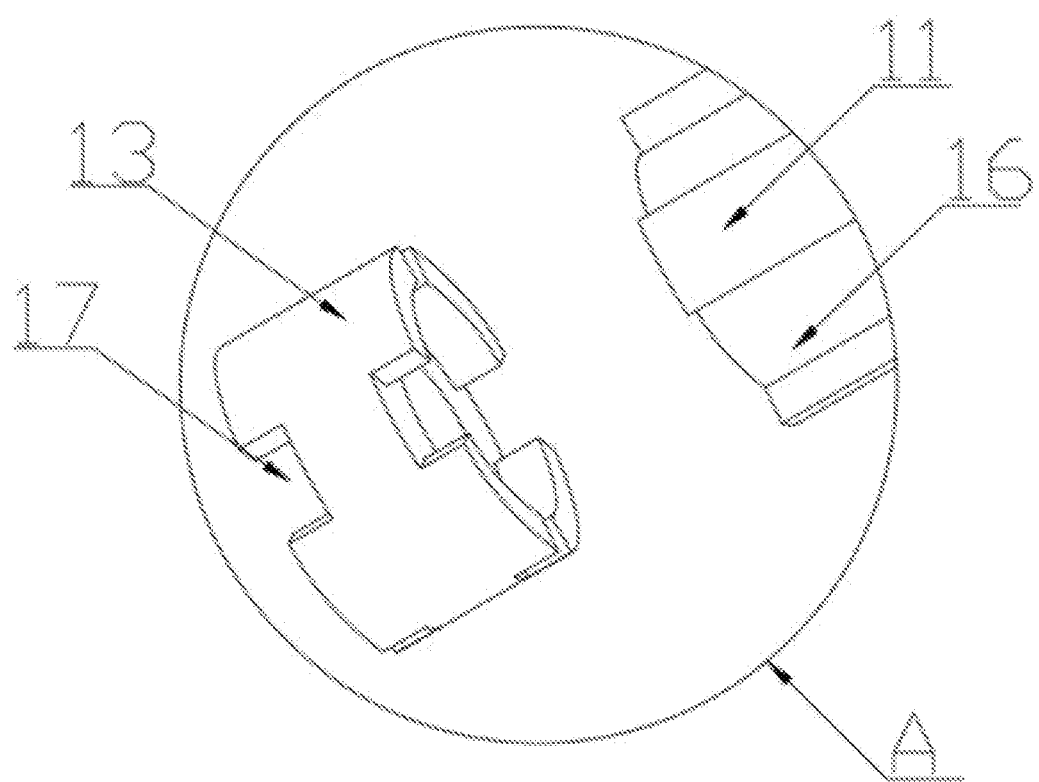
FIG. 14 is an enlarged view of a structure at A in FIG. 1 of the present invention.

Preferably, as shown in FIG. 8, the coil windings 9 match with the stator teeth 14; and each group of the coil windings 9 is provided with a first coil 91, a second coil 92, a third coil 93 and a fourth coil 94 respectively, a head of the first coil 91 is connected to a tail of the second coil 92, a head of the third coil 93 is connected to a tail of the fourth coil 94, a head of the second coil 92 and a head of the fourth coil 94 are electrically connected and led out, a tail of the first coil 91 and a tail of the third coil 93 are connected together and led out, magnetic fields of the same polarity can be generated in the axial direction, and anisotropic magnetic fields can be generated in the radial direction.

Preferably, the four coil windings 9 are divided into two groups, the two groups of coil windings 9 are respectively set as upper and lower windings and left and right windings, the upper and lower windings have identical magnetic fields after being electrified, and the left and right windings have opposite magnetic fields after being electrified.

Preferably, the four pieces of magnetic steel 12 are divided into two groups, the two pieces of magnetic steel 12 in each of the two groups have opposite polarities, and the two groups of magnetic steel 12 have correspondingly identical upper and lower polarities.

Preferably, one end of the motor shaft 2 extends out of one side of the motor housing 1.

The bottom end of the motor housing 1 is sealed to be waterproof through riveting of the end cover 4, the bearings 5 are used to form a bidirectional magnetic levitation motor structure relative to the stator assembly 6, thus the motor shaft 2 rotates more smoothly, wear of the motor shaft 2 is avoided, and meanwhile, the position of the motor shaft 2 can also be stabilized; at the same time, front and rear ends of the motor shaft 2 can be stressed more uniformly by means of a pair of bearings 5, and stable mounting is achieved, so that on one hand, supporting positions are provided for the motor shaft 2, compact mounting of the stator assembly 6 and the rotor assembly 7 is facilitated, stable matching is achieved, on the other hand, the stator assembly 6 and the rotor assembly 7 inside can also be protected against the pollution and influence of an external environment as much as possible, and continuous and stable power transmission of the motor shaft 2 can be ensured.

All the magnetic steel 12 is distributed around the rotor core 11, the radial spacing angles between the adjacent pieces of magnetic steel 12 on the rotor core 11 are preset values, and at least two of the preset values are different, that is, the magnetic steel 12 is unevenly distributed in the radial direction on the rotor core 11, so that the magnetic steel can drive the motor shaft 2 to swing left and right. In addition, the axial spacing of the adjacent pieces of magnetic steel 12 on the rotor core 11 is preset values, and at least two of the preset values are different, that is, the magnetic steel 12 is unevenly distributed in the axial direction on the rotor core 11, so that the magnetic steel can drive the motor shaft 2 to reciprocate. The spacing angles of the radial magnetic steel and the axial spacing values are optimized and are applied to an electric toothbrush, so that the torque and the telescopic distance can be increased, and the cleaning capability of the electric toothbrush can be improved.

The specific embodiment is as follows: during actual usage of the device, the coil windings 9 are electrified to form magnetic fields at the stator core 8, the magnetic steel 12 is located in the magnetic fields, the preset values are provided in the radial direction and in the axial direction, the magnetic steel interact with each other, stators of the same polarity push the anisotropic magnetic steel 12, the magnetic steel 12 of the same polarity is subjected to acting forces of magnetic fields of anisotropic stators, and thus the magnetic steel 12 and the rotor core 11 are driven to reciprocate vertically while rotating: the rotor core 11 is fixedly connected to the motor shaft 2 and then drives the motor shaft 2 to reciprocate vertically while rotating, the coil windings 9 switch a current direction and control the electrification time by means of an external circuit, thus rotors reciprocate left and right and up and down, and the movement of the rotor assembly 7 corresponds to the movement of the motor shaft 2; movement transmission is achieved by means of an electromagnetic effect, and mounting of elastic structures such as a torsion bar and the like is no longer needed, so that on one hand, the situation that the service life of a motor is short due to the fact that the elastic structures are prone to damage during usage is avoided, on the other hand, the motor in a unit volume can transmit torque in a larger value, and the volume of the motor can be minimized when the rated torque is reached: when the device is applied to the electric toothbrush, the weight of the electric toothbrush can be reduced, the electric toothbrush telescopes vertically while swinging left and right, which is closer to the feeling of brushing teeth in daily life, and the cleaning effect is greatly improved: power is transmitted by means of an electromagnetic structure, thus the power transmission process is more stable, the magnitude of swing of the motor shaft 2 will not change greatly in case of different loads, the usage by a user is facilitated, the gap that electric toothbrushes cannot telescope axially apart from radially swinging left and right in the market is filled, and the embodiment specifically solves the problem that the existing electric toothbrushes is inconvenient for all-around cleaning in the prior art.

The working principle of the present invention is as follows:

reference is made to FIGS. 1-7 of the specification, the coil windings 9 are electrified to form the magnetic fields at the stator core 8, the magnetic steel 12 is located in the magnetic fields, the preset values are provided in the radial direction and in the axial direction, under the interaction, the stators of the same polarity push the anisotropic magnetic steel 12, the magnetic steel 12 of the same polarity is subjected to the acting forces of the magnetic fields of the anisotropic stators, and thus the magnetic steel 12 and the rotor core 11 are driven to reciprocate vertically while rotating: the rotor core 11 is fixedly connected to the motor shaft 2 and then drives the motor shaft 2 to reciprocate vertically while swinging left and right, the coil windings 9 switch the current direction and control the electrification time by means of the external circuit, thus the rotors reciprocate left and right and up and down, and the movement of the rotor assembly 7 corresponds to the movement of the motor shaft 2; and the movement transmission is achieved by means of the electromagnetic effect, the power is transmitted by means of the electromagnetic structure, thus the power transmission process is more stable, and teeth are effectively cleaned while a toothbrush head is driven to swing in a reciprocating manner.

Some exemplary embodiments of the present invention are described in an illustrative manner above. There is no doubt about that for those of ordinary skill in the art, the described embodiments can be amended in different manners without departing from the spirit and the scope of the present invention. Therefore, the drawings and descriptions above are illustrative in essence, and should not be understood as limitations on the scope of protection of the claims of the present invention.

What is claimed is:

1. A bidirectional magnetic levitation acoustic motor device, comprising a motor housing and a motor shaft, wherein the motor shaft is arranged at an axis of the motor housing, an end cover is arranged at a bottom end of the motor housing, shaft holes are formed in axes of the motor housing and the end cover, the motor shaft penetrates through the two shaft holes, bearings are arranged at junctions of the motor shaft and the shaft holes, a transmission unit is arranged inside the motor housing, the transmission unit comprises a stator assembly and a rotor assembly, and the rotor assembly is arranged inside the stator assembly;

the stator assembly comprises a stator core and coil windings, insulated coil holders are arranged on two sides of the stator core, stator teeth are arranged at two ends inside the stator core, a pole shoe is fixedly connected to the side of each of the stator teeth that is away from the stator core, the pole shoes match with the rotor assembly, the coil windings are wound around two sides of the stator core, and two ends of each of the coil windings are wound around the insulated coil holders; and the rotor assembly comprises a rotor core and magnetic steel, the rotor core is arranged on an outer side of the motor shaft in an overlying manner, four placing grooves are formed in an outer side surface of the rotor core, the four placing grooves are symmetrically distributed about a bisector of the rotor core, the spacing angles between each of the placing grooves and the placing grooves on two sides thereof are unequal, the magnetic steel is arranged in the four placing grooves, the four pieces of magnetic steel are distributed in a height staggered manner, self-attraction surfaces and non-self-attraction surfaces are formed by the magnetic steel and the stator core, and areas of the self-attraction surfaces are greater than areas of the non-self-attraction surfaces; and wherein the four pieces of magnetic steel are divided into two groups, the two pieces of magnetic steel in each of the two groups have opposite polarities, and the two groups of magnetic steel have correspondingly identical upper and lower polarities.

2. The bidirectional magnetic levitation acoustic motor device according to claim 1, wherein one or more transmission units are arranged, a rotor framework is arranged between every two adjacent rotor cores, and every two adjacent rotor cores are connected by means of the rotor framework.

3. The bidirectional magnetic levitation acoustic motor device according to claim 2, wherein clamping grooves are formed in two ends of the rotor framework, the clamping grooves match with the rotor cores in section shape, and the clamping grooves are connected to the rotor cores in a buckled manner.

4. The bidirectional magnetic levitation acoustic motor device according to claim 1, wherein the motor housing has a flat or circular section, both the end cover and the stator core match with an inner contour of the motor housing, and the end cover is connected to the motor housing in a riveted manner.

5. The bidirectional magnetic levitation acoustic motor device according to claim 1, wherein the coil windings match with the stator teeth; and each group of the coil windings is provided with a first coil, a second coil, a third coil and a fourth coil respectively, a head of the first coil is connected to a tail of the second coil, a head of the third coil is connected to a tail of the fourth coil, a head of the second coil and a head of the fourth coil are electrically connected and led out, and a tail of the first coil and a tail of the third coil are connected together and led out.

6. The bidirectional magnetic levitation acoustic motor device according to claim 5, wherein the four coil windings are divided into two groups, the two groups of coil windings are respectively set as upper and lower windings and left and right windings, the upper and lower windings have identical magnetic fields after being electrified, and the left and right windings have opposite magnetic fields after being electrified.

7. The bidirectional magnetic levitation acoustic motor device according to claim 1, wherein one end of the motor shaft extends out of one side of the motor housing.

* * * * *